United States Patent
Bleckmann et al.

(10) Patent No.: US 7,272,719 B2
(45) Date of Patent: Sep. 18, 2007

(54) METHOD TO CONTROL ACCESS BETWEEN NETWORK ENDPOINTS BASED ON TRUST SCORES CALCULATED FROM INFORMATION SYSTEM COMPONENT ANALYSIS

(75) Inventors: David Maurits Bleckmann, Portland, OR (US); William Wyatt Starnes, Portland, OR (US); Bradley Douglas Andersen, Tigard, OR (US)

(73) Assignee: Signacert, Inc., Portland, OR (US)

( * ) Notice: Subject to any disclaimer, the term of this patent is extended or adjusted under 35 U.S.C. 154(b) by 0 days.

(21) Appl. No.: 11/288,820

(22) Filed: Nov. 28, 2005

(65) Prior Publication Data

US 2006/0117184 A1 Jun. 1, 2006

Related U.S. Application Data (60) Provisional application No. 60/637,066, filed on Dec. 17, 2004, provisional application No. 60/631,449, filed on Nov. 29, 2004, provisional application No. 60/631,450, filed on Nov. 29, 2004.

(51) Int. Cl.
*H04L 9/00* (2006.01)
*H04K 1/00* (2006.01)

(52) U.S. Cl. .............................. 713/176; 726/3; 726/16

(58) Field of Classification Search .................... None
See application file for complete search history.

(56) References Cited

U.S. PATENT DOCUMENTS

| | | | | |
|---|---|---|---|---|
| 5,919,257 A * | 7/1999 | Trostle | | 726/22 |
| 6,157,721 A | 12/2000 | Shear et al. | | |
| 6,327,652 B1 * | 12/2001 | England et al. | | 713/2 |
| 7,024,548 B1 * | 4/2006 | O'Toole, Jr. | | 713/1 |
| 2002/0144149 A1 * | 10/2002 | Hanna et al. | | 713/201 |
| 2003/0177394 A1 * | 9/2003 | Dozortsev | | 713/201 |
| 2005/0132122 A1 * | 6/2005 | Rozas | | 711/100 |
| 2005/0138417 A1 * | 6/2005 | McNerney et al. | | 713/201 |
| 2005/0184576 A1 | 8/2005 | Gray et al. | | |
| 2007/0050622 A1 * | 3/2007 | Rager et al. | | 713/168 |

FOREIGN PATENT DOCUMENTS

WO  WO 2006/058313 A2 *  6/2006

* cited by examiner

*Primary Examiner*—Christopher Revak
(74) *Attorney, Agent, or Firm*—Marger, Johnson & McCollom, P.C.

(57) ABSTRACT

Signatures are generated for modules in a computer system. The signatures can be assembled into an integrity log. The signatures are compared with signatures in a database in an integrity validator. Once signatures are either validated or invalidated, a trust score can be generated. The trust score can then be used to determine whether the computer system should be granted access to a resource using a policy.

19 Claims, 10 Drawing Sheets

METHOD TO CONTROL ACCESS BETWEEN NETWORK ENDPOINTS BASED ON TRUST SCORES CALCULATED FROM INFORMATION SYSTEM COMPONENT ANALYSIS

RELATED APPLICATION DATA

This application claims the benefit of common-assigned U.S. Provisional Patent Application Ser. No. 60/631,449, titled "METHOD TO HARVEST, SUBMIT, PERSIST, AND VALIDATE DATA MEASUREMENTS EMPLOYING WEB SERVICES", filed Nov. 29, 2004, commonly-assigned U.S. Provisional Patent Application Ser. No. 60/631,450, titled "METHOD TO VERIFY SYSTEM STATE AND VALIDATE INFORMATION SYSTEM COMPONENTS BY MEANS OF WEB SERVICES USING A DATABASE OF CRYPTOGRAPHIC HASH VALUES", filed Nov. 29, 2004, and commonly-assigned U.S. Provisional Patent Application Ser. No. 60/637,066, titled "METHOD TO CONTROL ACCESS BETWEEN NETWORK ENDPOINTS BASED ON TRUST SCORES CALCULATED FROM INFORMATION SYSTEM COMPONENTS", filed Dec. 17, 2004, all of which are hereby incorporated by reference.

FIELD OF THE INVENTION

This invention pertains to computer module validation, and more particularly to determining the integrity of a computer before granting the computer access to network resources.

BACKGROUND OF THE INVENTION

Where once computer networks were scarce, computer networks are now quite common. Most businesses have computers that are networked together: large businesses can have hundreds or even thousands of computers connected by a network. Computer networks are also beginning to penetrate the home: as each person in a household wants their own computer, the computers need to be networked to share resources: for example, the connection to the Internet. Companies that manufacture equipment to support computer networking such as routers have responded by making the equipment easier to install and use. Frequently, a user needs to do little more than, say, plug their computers into a router, power the router up, and forget about the equipment.

But that self-same ease to network installation has made computers more vulnerable. Viruses, worms, Trojan horses, and logic bombs are being written with ever-increasing frequency. And the Internet, along with the networks connected to the Internet, has made the proliferation of these dangers easier and more likely to occur.

For users, being hit with a virus or one of its kin is, at the very least, annoying. At best, a user has to spend the time necessary to identify which computers on his personal network are infected with the virus, and then disinfect the computers. At worst, being infected with a virus might require erasing the hard drive and rebuilding the software from scratch. This might require the user to lose all of the data stored on the infected computers.

For personal users, the data on their computers might be irreplaceable and priceless (for example, family photos, or personal documents). But life would go on. But for businesses, such loss of data could be devastating. Even with a proper archive policy in place, the time required to rebuild computer systems and the business network could cost thousands of dollars or more, both in lost revenue and in the costs of actually rebuilding the computers and the network. Then there is the potential loss of goodwill in having to close while the computers and the network are rebuilt.

Accordingly, a need remains for a way to identify computers that are in a potentially improper state before the computers are given access to network resources, to address these and other problems associated with the prior art.

SUMMARY OF THE INVENTION

The invention includes methods and apparatuses for constructing a database of valid module signatures, for validating a module, and for validating a computer. To validate a computer, an apparatus receives signatures generated for modules in the computer. The signatures can be assembled into an integrity log. The apparatus attempts to validate that each signature is correct by comparing the signatures with a database. After the signatures are validated or not, the apparatus generates a trust score based upon which signatures received from the computer were validated.

The foregoing and other features, objects, and advantages of the invention will become more readily apparent from the following detailed description, which proceeds with reference to the accompanying drawings.

DETAILED DESCRIPTION OF THE PREFERRED EMBODIMENT

Figure 1:
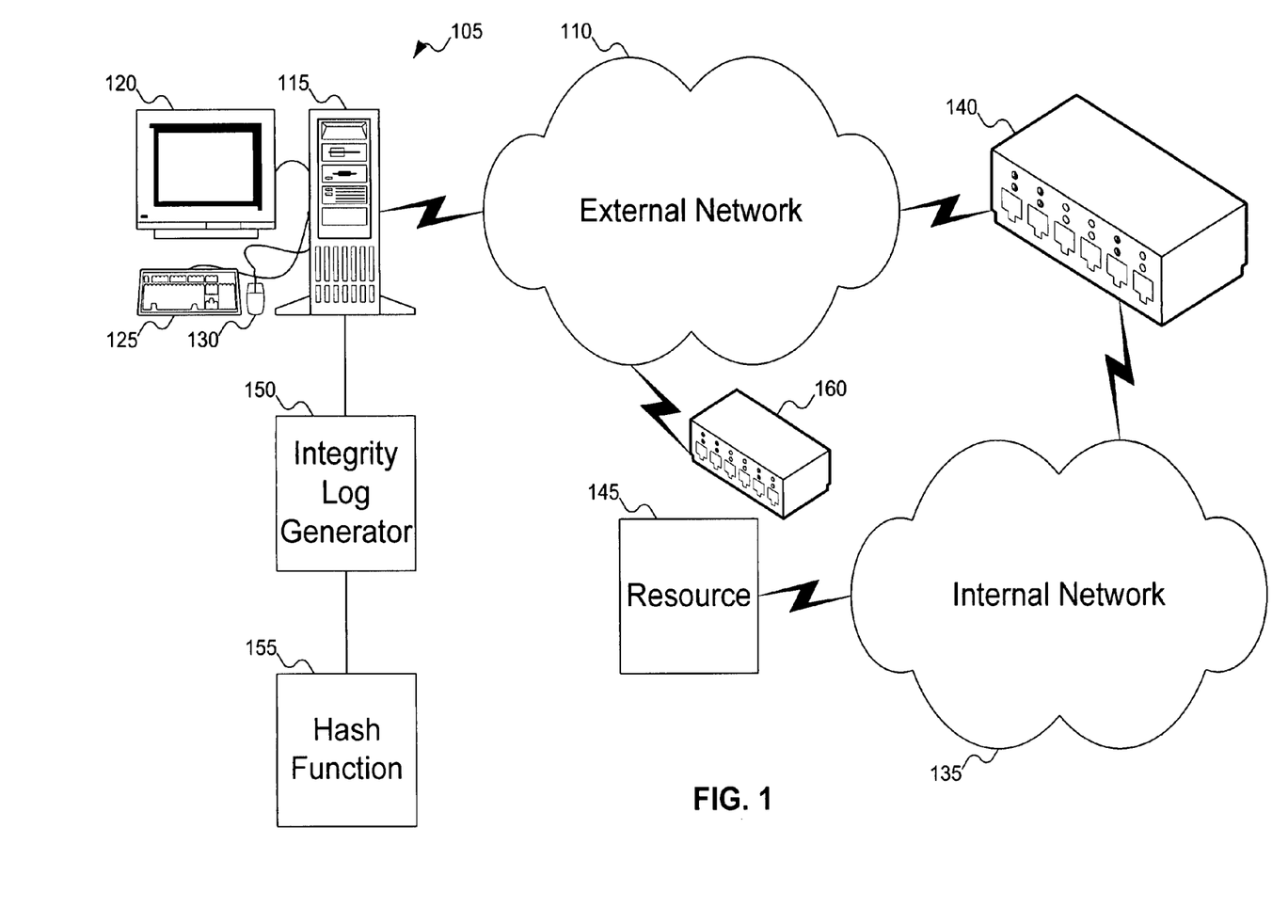
FIG. 1 shows a system including an integrity validator to perform computer validation.

FIG. 1 shows a system including an integrity validator to perform computer validation. In FIG. 1, computer system 105 is connected to external network 110. Computer system 105 is shown as including computer 115, monitor 120, keyboard 125, and mouse 130. But a person skilled in the art will recognize that other components can be included with computer system 105: for example, other input/output devices, such as a printer. In addition, FIG. 1 does not show some of the conventional internal components of computer system 105; for example, a central processing unit, memory, etc. Further, computer system 105 could be replaced by other machines, such as a notebook computer, dedicated terminal, or Personal Digital Assistant (PDA), among other possibilities.

External network 110, as its name suggests, is a network that is external to the organization. In contrast, internal network 135 is a network that is internal to the organization. Integrity validator 140 is interposed between external network 110 and internal network 135 to validate computers that are outside the organization but are requesting access to a resource internal to the organization, such as resource 145. Resource 145 could be any type of resource: for example, a network drive, directory, or file, or a web page, to name some examples. To support such validation, computer system 105 includes integrity log generator 150, which assembles the integrity log for the computer system. Integrity validator 140 can then use the integrity log to validate computer system 105.

An integrity log is a set of signatures for various modules on computer system 105. In one embodiment, these signatures are hashes of the various modules, and can be generated using hash function 155, such as MD5, SHA-1, or SHA-256. In one embodiment, integrity log generator 150 can be a device driver that loads early in the system boot sequence (preferably, before any other drivers have been loaded). Integrity log generator 150 can then identify each module that is accessed or loaded during the system boot sequence, and generate a signature for these modules. In another embodiment, integrity log generator 150 can be an executable that can scan the entire system for all potential modules. A person skilled in the art will recognize other ways in which integrity log generator 150 can operate.

In one embodiment, integrity log generator 150 generates signatures only for modules, such as device drivers and executable modules, that are actually loaded. In another embodiment, integrity log generator 150 generates signatures for such modules and for all supporting modules: for example, dynamic link libraries (DLLs). A person skilled in the art will recognize other modules for which integrity log generator 150 can generate signatures, and other ways in which integrity log generator 150 can operate.

From the above description, it might appear that integrity log generator 150 operates only on software modules. While software modules typically comprise the majority of modules for which integrity log generator 150 generates signatures, a person skilled in the art will recognize that integrity log generator 150 can generate signatures for hardware modules as well. For example, integrity log generator 150 can generate signatures for firmware or hardware modules, such as that used in the Basic Input/Output System (BIOS) of the computer system, however stored (e.g., in flash memory, read-only memory (ROM), programmable read-only memory (PROM), erasable programmable read-only memory (EPROM), electrically-erasable programmable read-only memory (EEPROM), ferroelectric random access memory (FRAM), magnetoresistive random access memory (MRAM), etc.).

Once the signatures are generated, integrity log generator 150 then assembles the signatures into an integrity log. The integrity log can also include identifiers for the modules from which the signatures were generated. Different identifiers can include:

The absolute path and file name of the module.
The manufacturer of the module.
The product or component in which the module resides. Put another way, the identifier can identify the product or component with which the module interacts.
The version and/or patch level of the module or the product or component in which the module resides, so as to be able to distinguish different versions of the same module.

A person skilled in the art will recognize other types of identifiers that can be used.

In one embodiment, integrity validator 140 is used only to validate computer systems that are not directly connected to internal network 135. In this embodiment, there is an implicit assumption that computer systems connected to internal network 135 are known to be safe and validated. This is not necessarily an unreasonable assumption, as computer systems internal to an organization are typically controlled by the organization. Thus, the likelihood of infection by a virus or similar agent is reduced relative to computer systems outside the control of the organization. By making this assumption, computer systems internal to the organization are granted faster access to requested resources, as there is no need to validate such computer systems.

Nevertheless, in a second embodiment, even computer systems that are directly connected to internal network 135 (and thus are not requesting resources through external network 110) are also validated when they request access to resources. While potentially delaying access to requested resources, such validation provides greater security, in that malicious agents can be detected even on computer systems internal to the organization.

In the embodiment shown in FIG. 1, integrity validator 140 is shown as directly connected to internal network 135. This embodiment works well when computer systems internal to the organization include modules that are not available to the general public: for example, if the modules are products under development or are classified (e.g., by the government). This embodiment will also work for organizations that use only commercially available modules, but this embodiment would require the organization to include integrity validator 140 as part of its system. In another embodiment, useful when the organization uses only commercially available modules, integrity validator 140 can be a publicly accessible integrity validator, rather than one dedicated to the organization. Such an integrity validator would be connected to external network 110, as integrity validator 160. Integrity validator 160 operates similarly to integrity validator 140, except that the integrity log is forwarded to integrity validator 160 via external network 110.

As discussed above, in one embodiment, integrity validator 140 operates to validate network access to resources from within the organization. While it is possible for integrity validator 140 to store signatures for every potential module on a computer system, in another embodiment, integrity validator 140 only stores signatures for modules that are specific to the organization. For modules that are standard modules (or otherwise unrecognized by integrity validator 140), integrity validator 140 forwards the signatures to integrity validator 160 (via external network 110) for validation. In this manner, integrity validator 140 does not need to be updated as new modules are introduced: validation of these modules can be handled by integrity validator 160.

Where computer system 105 is not directly connected to internal network 135, integrity validator 140 can operate whether resource 145 is requested in either an encrypted or unencrypted form, and whether resource 145 is requested using an encrypted or unencrypted channel. For example, resource 145 might be a web page that is password-protected. Or, resource 145 might be requested over a virtual private network (VPN) used to secure access to resources. A person skilled in the art will recognize other ways in which access to resource 145 can be managed.

Figure 2:
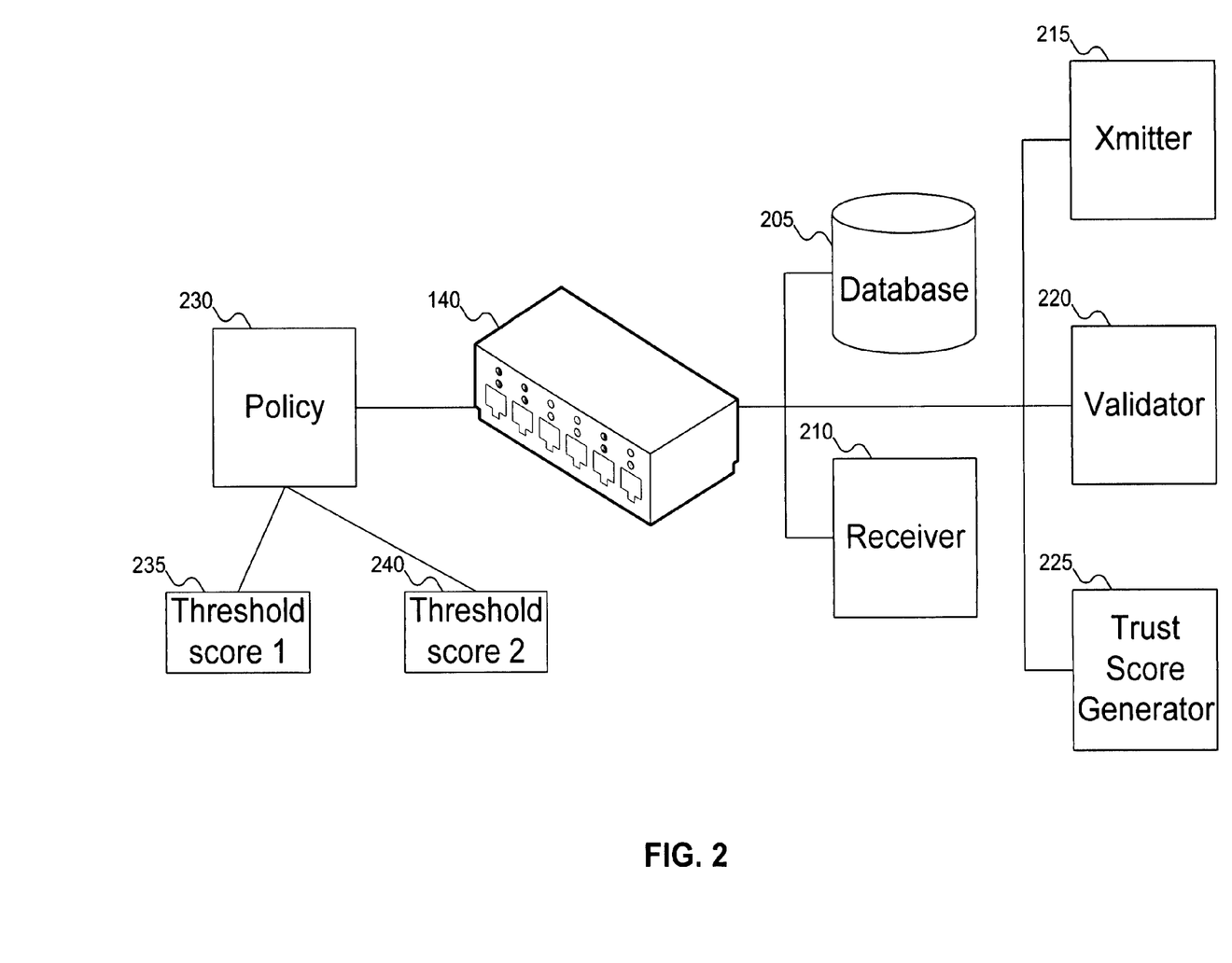
FIG. 2 shows more details about the integrity validator of FIG. 1 used to perform computer validation.

FIG. 2 shows more features of the integrity validator of FIG. 1 used to perform computer validation. In FIG. 2, integrity validator 140 is shown in greater detail, but a person skilled in the art will recognize that the details shown can apply to any integrity validator: for example, integrity validator 160. In addition, a person skilled in the art will recognize that FIG. 2 does not represent data flow through integrity validator 140.

Figure 3:
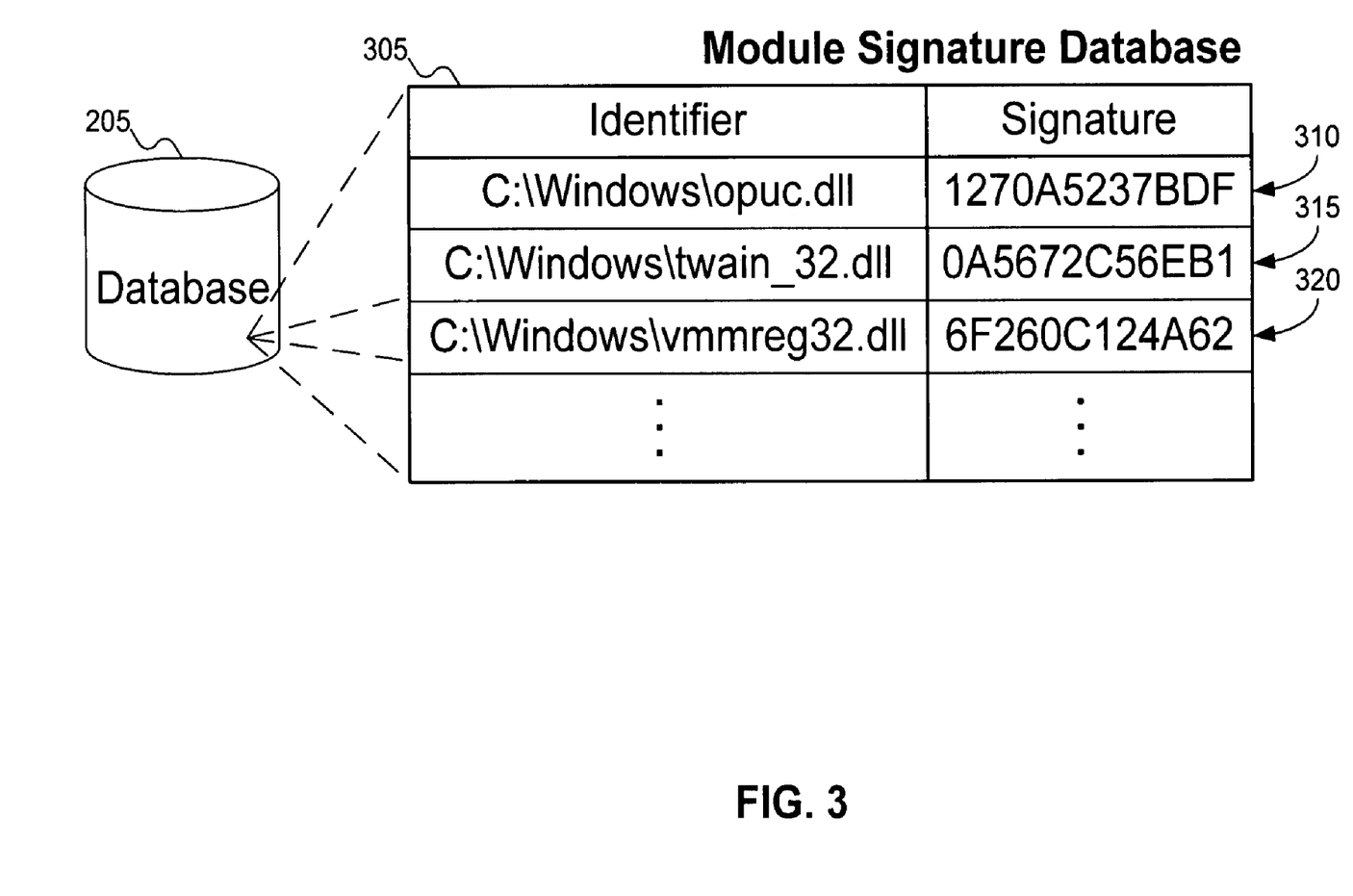
FIG. 3 shows more details about the database of FIG. 2.

Integrity validator 140 includes database 205. Database 205 is shown in greater detail in FIG. 3. FIG. 3 shows database 205 represented as table 305, although a person skilled in the art will recognize other forms database 205 can take. Table 305 includes numerous entries, of which entries 310, 315, and 320 are shown. Each entry includes a module and a corresponding signature. For example, entry 320 shows a signature for the virtual memory manager DLL of the Windows® XP operating system. (The signature shown for entry 320 is not a real signature, but rather a random number that represents a signature.) While entries 310, 315, and 320 describe modules that are used with versions of the Windows operating system by Microsoft Corporation, a person skilled in the art will recognize that embodiments of the invention are equally applicable to other operating systems: for example, versions of the Linux® operating system. (Microsoft and Windows are registered trademarks of Microsoft Corporation in the United States and other countries; Linux is a registered trademark of Linus Torvalds.)

As noted above, the entries in table 305 include identifiers for the various modules. By including module identifiers in table 305, a signature provided for module validation can be compared to the signature expected for that module, to verify that the module is properly validated. Table 305 shows only one module identifier—the path and file name of the module—but a person skilled in the art will recognize that table 305 can use other module identifiers, or any combination of module identifiers.

In another embodiment, table 305 includes only valid signatures, without module identifiers. In that case, a signature provided for module validation is compared with all signatures in database 205 until a match is found. If a match is found anywhere in database 205, then the module is considered validated; otherwise, the module is not considered validated. Provided that the function chosen to compute the signatures (that is, the hash function) has a low probability of collision, the risk of the signature of an unvalidated module matching a signature in the database is likely not significant. But by including module identifiers in database 205, this risk can be effectively eliminated.

Returning to FIG. 2, integrity validator 140 includes other elements. Receiver 210 is responsible for receiving information transmitted to integrity validator 140. For example, receiver 210 can receive an integrity log from a computer system to be validated, a signature to be added to database 205 for a newly validated module, or a replacement signature to replace an older signature for an existing module in database 205. Transmitter 215 is responsible for transmitting information from integrity validator 140. For example, transmitter 215 can transmit a trust score to a computer system, or can forward signatures to another integrity validator (if integrity validator 140 cannot validate the modules corresponding to those signatures).

Validator 220 is responsible for validating signatures received by integrity log validator 140. Validator 220 takes one or more signatures, determines which signatures are valid, and returns an indication of which signatures are valid and which are not. Validator 220 can be as simple as a comparator to compare the received signature(s) with signatures in database 205 and indicate whether the signature(s) can be matched to signatures in database 205. Validator 220 can also implement a more complicated technique to validate signature, if desired.

Trust score generator 225 is responsible for generating a trust score for a computer system. A trust score is an indication of whether a computer system is trustworthy. Trust scores can be generated in many different ways. In one embodiment, the trust score is the ratio of the number of validated modules on the computer system to the total number of modules on the computer system (validated or not). In another embodiment, the trust score can be scaled to a number between 0 and 1000, where 0 represents a completely untrustworthy computer system, and 1000 represents a completely trustworthy computer system. In yet another embodiment, critical modules can be weighted more highly than other modules, so that a computer system with more validated critical modules can score more highly than a computer system with few validated critical modules, even if the second computer system has more total modules validated. (The definition of "critical" is not intended to refer to modules that are absolutely necessary as much as modules that are identified as important to the organization. Thus, one organization might consider the files relating to the operating system to be "critical", whereas another organization might consider modules that are custom developed internally (for whatever purpose) to be "critical".)

There are other ways in which trust score generator 225 can calculate the trust score. In another embodiment, trust score generator can factor in the position of the various validated modules within the integrity log: for example, modules that are listed earlier in the integrity log can be considered more important than modules that occur later in the integrity log. In another embodiment, trust score generator 225 can factor in the module identifier in calculating the trust score. Modules manufactured by one manufacturer can be considered more important than modules manufactured by another manufacturer. For example, consider modules that work in conjunction with an application. Modules manufactured by the application manufacturer can be considered more important than modules manufactured by third-party manufacturers.

In yet another embodiment, the version and/or patch level of the module can be a factor in calculating the trust score. For example, given a module that has several versions, more recent versions can be considered more important than older versions. If the validated module is outdated, the resulting trust score can be lower than an otherwise-identical computer system with a more current version of the same module.

Integrity validator 140 can also include policy 230. Policy 230 can indicate how and under what conditions a computer system can be permitted access to a resource, such as resource 145 of FIG. 1. In one embodiment, policy 230 includes threshold score 235. To be granted access to the resource, the computer system should have a trust score at least as high as threshold score 235; if the trust score for the computer system does not meet or exceed threshold score 235, then the computer system is denied access to the resource.

In another embodiment, policy 230 can include multiple threshold scores. For example, in FIG. 2, policy 230 is shown as including two threshold scores 235 and 240. If the trust score for the computer system is at least as high as threshold score 235, then the computer system can be granted full access to the resource. If the trust score for the computer is less than threshold score 235 but at least as high as threshold score 240, then the computer system can be granted partial access to the resource. And if the trust score for the computer system is smaller than threshold score 240, the computer system can be denied access to the resource (although the computer system can be redirected to a help resource to determine why the computer system has such a low trust score).

While policy 230 is described above in terms of one resource and up to two threshold scores, a person skilled in the art will recognize that policy 230 can be defined in other ways. For example, policy 230 can describe different policies for different resources on the same network. Or permission to access the resource can be determined in ways other than straight comparisons between the trust score of the computer system and one or more threshold scores. In addition, while policy 230 is a policy for accessing resources for a particular organization, if integrity validator 140 is, in fact, used by multiple organizations (e.g., integrity validator 140 is connected to the external network as integrity validator 160), then integrity validator 140 can store policies for multiple organizations.

While FIG. 2 shows integrity validator 140 as including both the features used to generate a trust score and policy 230, a person skilled in the art will recognize that integrity validator 140 does not need to combine these features. For example, integrity validator 140 can be responsible for generating the trust score, and policy management (based on the generated trust score) can be handled elsewhere.

Figure 4:
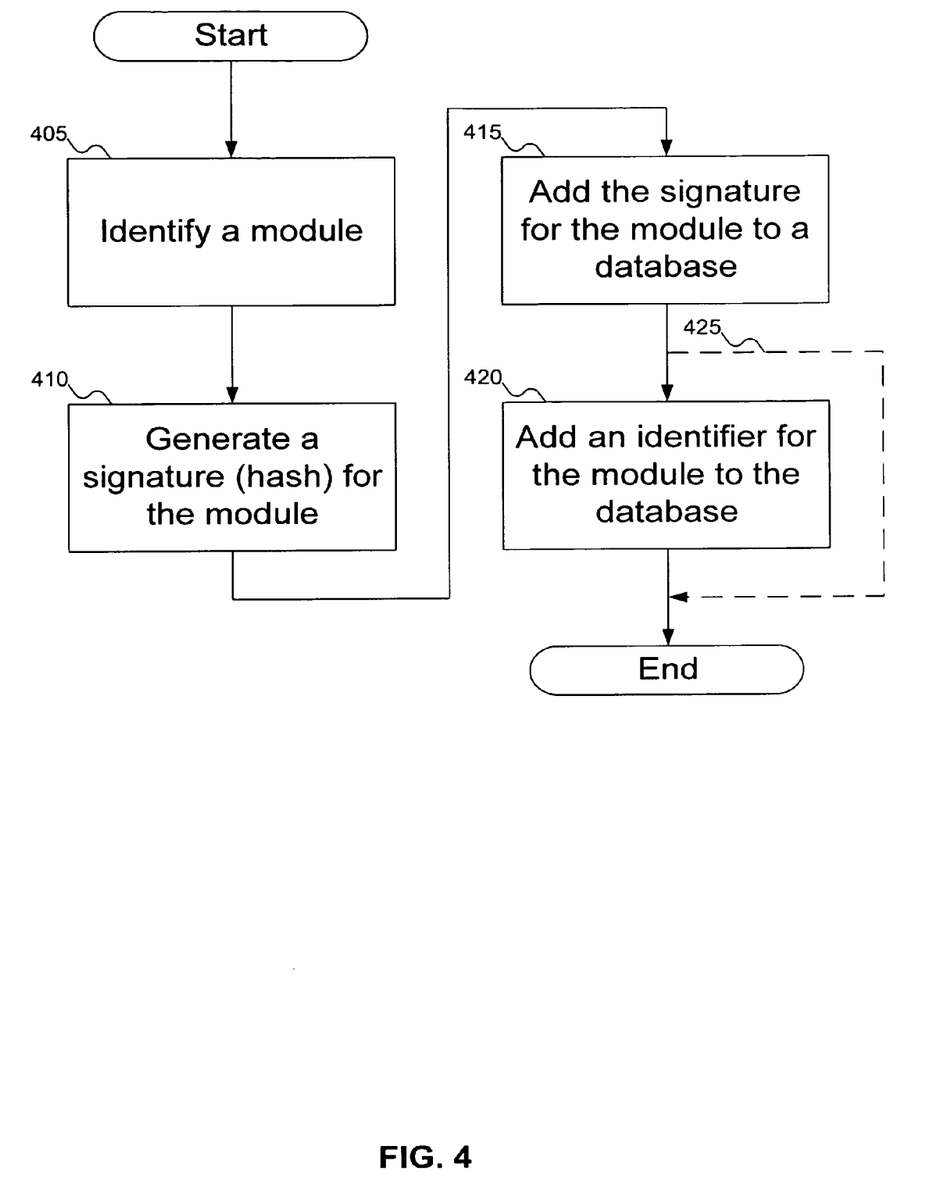
FIG. 4 shows a flowchart of the procedure used by the integrity validator of FIG. 1 to assemble the database of FIG. 2.

FIG. 4 shows a flowchart of the procedure used by the integrity validator of FIG. 1 to assemble the database of FIG. 2. In FIG. 4, at step 405, a module is identified. As FIG. 4 is concerned with assembling the database used to validate computer systems, module identification is likely a manual process: for example, a module manufacturer can submit a module for signature generation and addition to the database. But a person skilled in the art will recognize that module identification can be automated. At step 410, a signature is generated for the identified module. At step 415, the signature is added to the database. Finally, at step 420, an identifier for the module can be added to the database and associated with the signature, to aid in later module validation. As shown by arrow 425, step 420 is optional, and can be omitted.

Figure 5A:
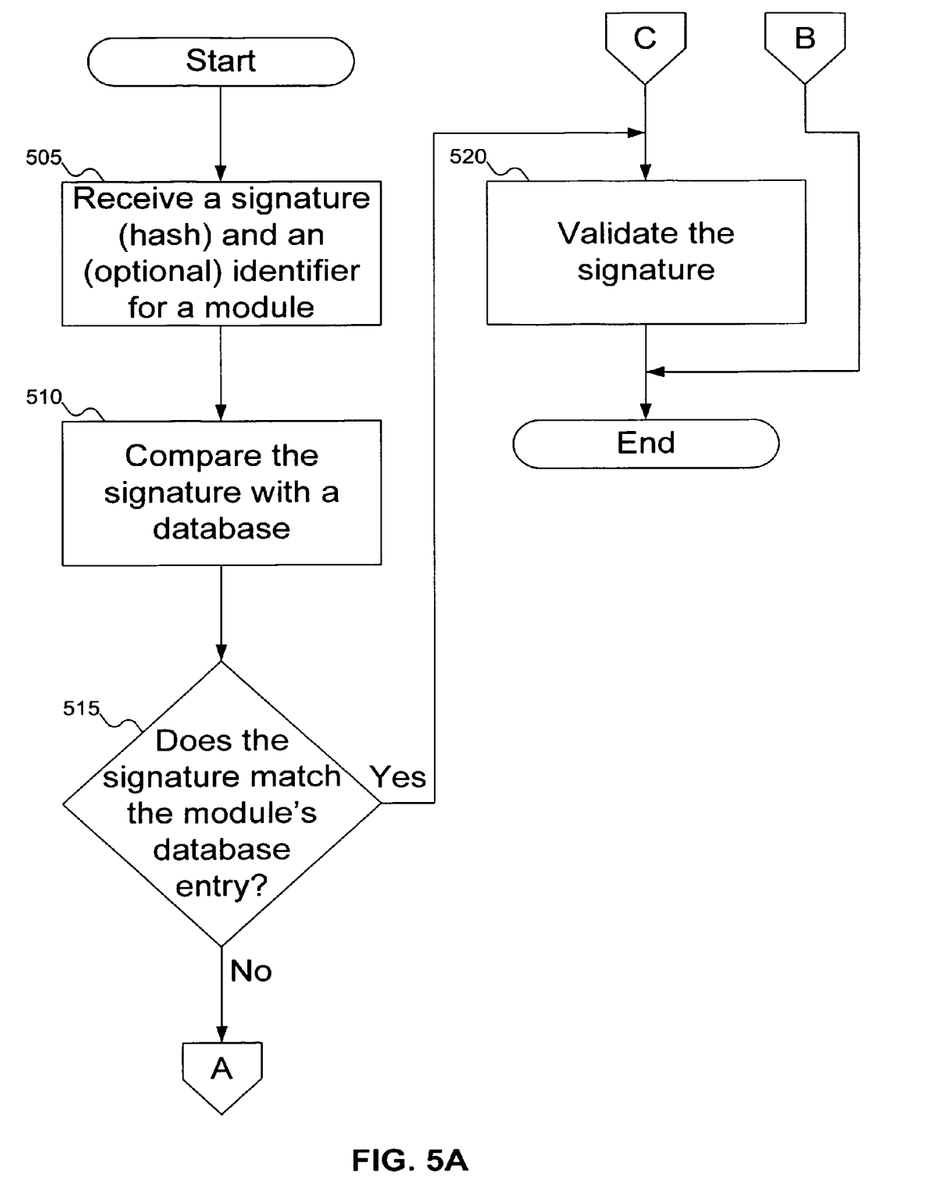
FIGS. 5A-5B show a flowchart of the procedure used by the integrity validator of FIG. 1 to validate an individual module signature.
Figure 5B:
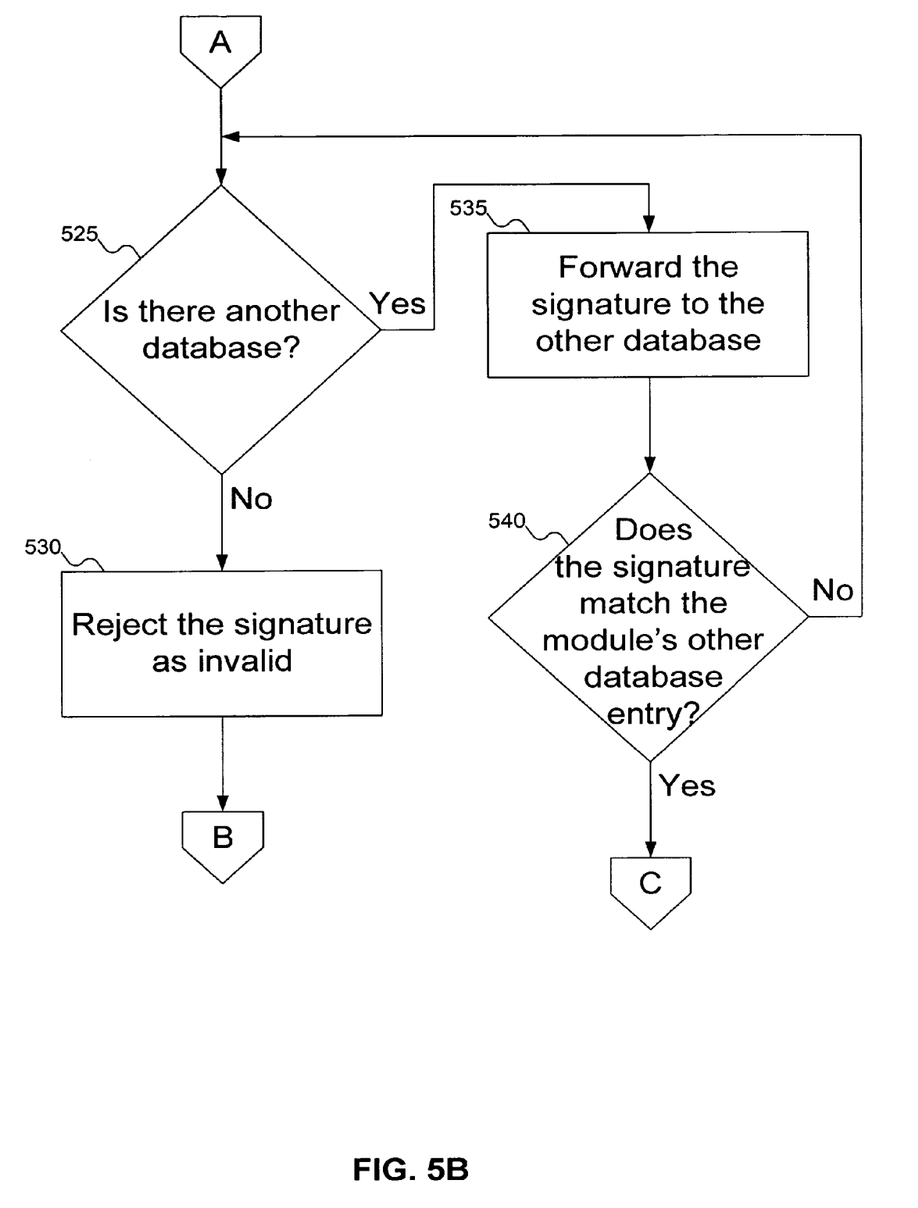

FIGS. 5A-5B show a flowchart of the procedure used by the integrity validator of FIG. 1 to validate an individual module signature. In FIG. 5A, at step 505, the integrity validator receives a signature, and potentially an identifier, for a module. At step 510, the signature is compared with the database. If a module identifier is provided, then it can be used to reduce the search space of the database. At step 515, the integrity validator determines whether the signature was found in the database. If so, then at step 520 the signature was validated.

If the integrity validator did not find the signature in the database, then at step 525 the integrity validator determines if there is another database (or integrity validator) that can validate the signatures. If not, then at step 530, the signature is rejected as invalid, and processing ends. Otherwise, then at step 535 the integrity validator forwards the signature to the other database (or integrity validator). At step 540, the integrity validator determines whether the signature was found in the other database. If so, then processing returns to step 520, and the signature is validated. Otherwise, processing returns to step 525 to determine if there is another database (or integrity validator) to which the signature can be forwarded.

Figure 6:
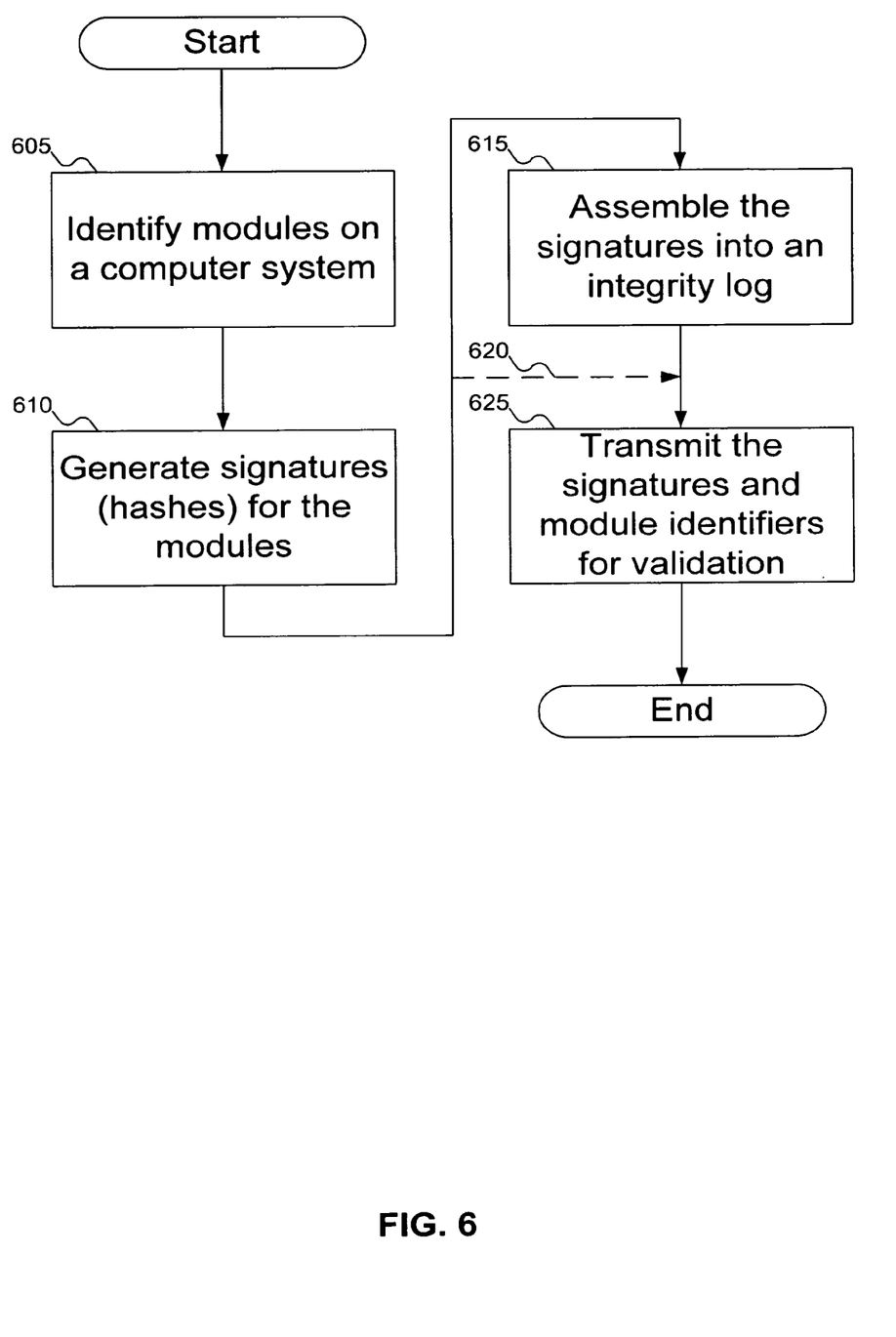
FIG. 6 shows a flowchart of the procedure used by a computer system, such as the computer system of FIG. 1, to assemble an integrity log to validate the computer system using the integrity validator of FIG. 1.

FIG. 6 shows a flowchart of the procedure used by a computer, such as the computer of FIG. 1, to assemble an integrity log to validate the computer using the integrity validator of FIG. 1. At step 605, the integrity log generator identifies modules on the computer system. At step 610, the integrity log generator generates signatures for the modules. At step 615, the integrity log generator can optionally assemble the signatures into an integrity log. As shown by arrow 620, step 615 is optional: the signatures do not need to be assembled into an integrity log. Finally, at step 625, the integrity log generator transmits the signatures, and optionally the module identifiers, to an integrity validator for validation.

Figure 7A:
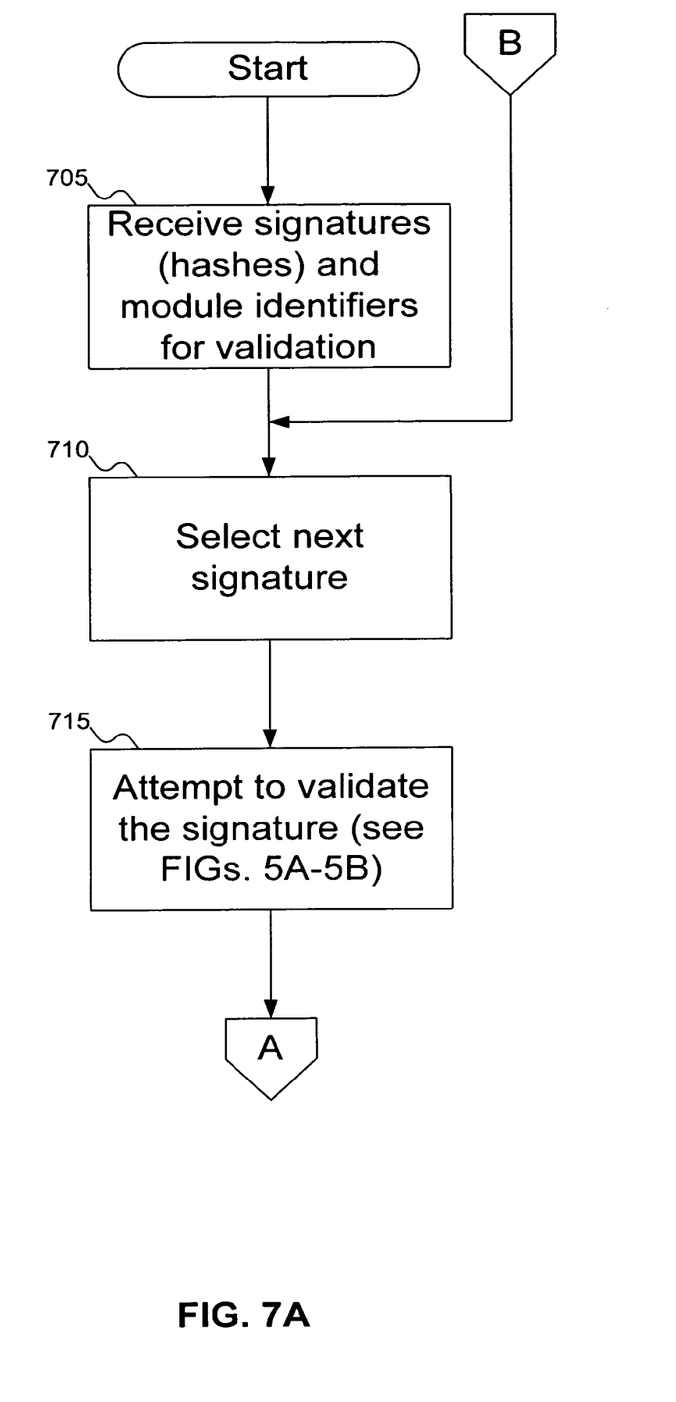
FIGS. 7A-7B show a flowchart of the procedure used by the integrity validator of FIG. 1 to validate a computer system.
Figure 7B:
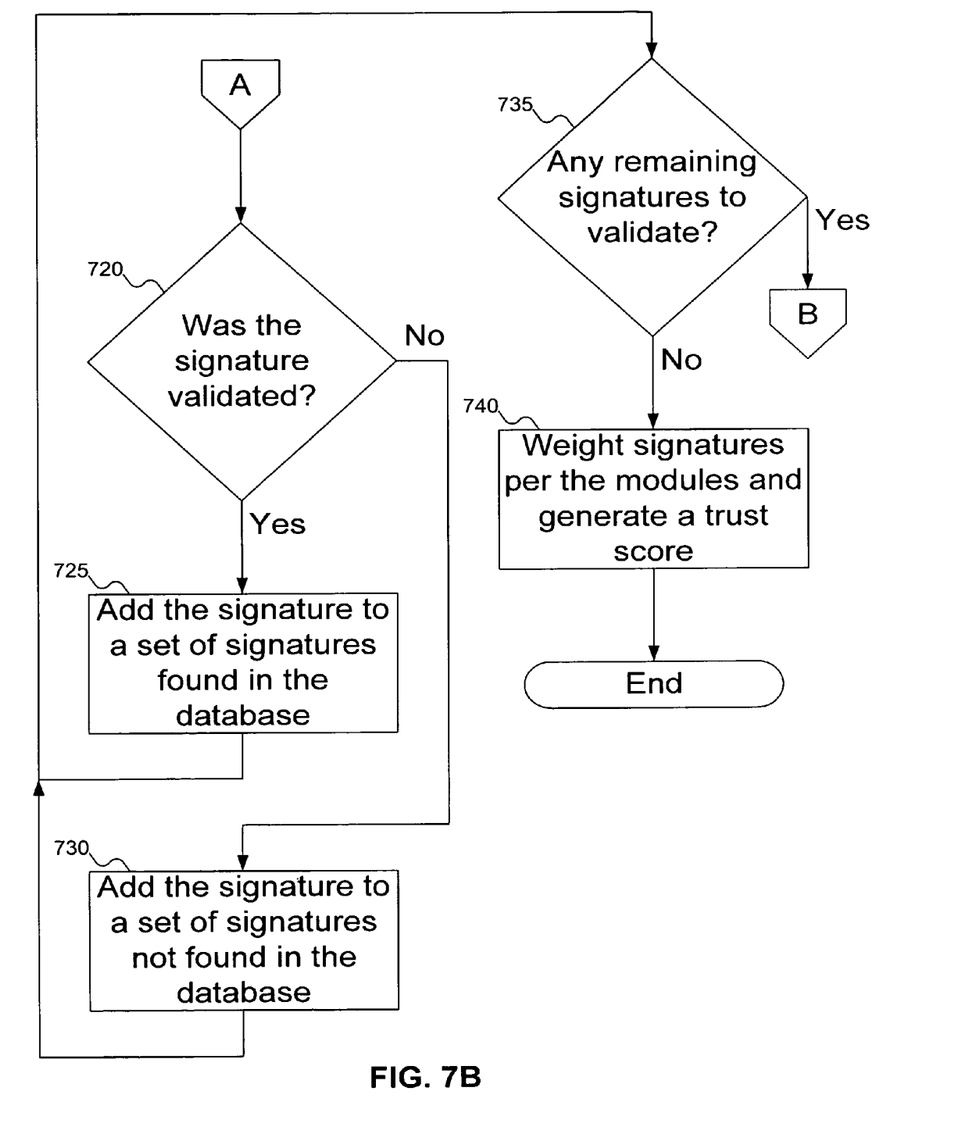

FIGS. 7A-7B show a flowchart of the procedure used by the integrity validator of FIG. 1 to validate a computer. In FIG. 7A, at step 705, the integrity validator receives signatures, and optionally, module identifiers, for validation. At step 710, the integrity selects a signature for validation. The signature selected can be the next one in sequence, or can be selected according to some other criteria. At step 715, the integrity validator attempts to validate the signature, as described above with reference to FIGS. 5A-5B.

At step 720 (FIG. 7B), the integrity validator determines whether the signature was validated. If so, then at step 725 the integrity validator adds the signature to the set of signatures that are found in the database; otherwise, at step 730 the integrity validator adds the signature to the set of signatures that are not found in the database. Either way, at step 735, the integrity validator checks to see if there are any signatures remaining to validate. If so, then processing returns to step 710 on FIG. 7A. Otherwise, at step 740, the integrity validator generates a trust score. As discussed above with reference to FIG. 2, the trust score can weight certain signatures more highly than others in generating the trust score.

As discussed above, step 715 refers to FIGS. 5A-5B in how to validate signatures for a computer system. As discussed above, FIGS. 5A-5B describes processing a single signature, and forwarding the signature to another integrity validator in case the first integrity validator cannot validate the signature. While this approach works well for individual signatures, with multiple signatures, such as in an integrity log, an alternative embodiment processes as many signatures as possible using the first integrity validator, and forwarding the unvalidated signatures to a second integrity validator as a group.

Figure 8:
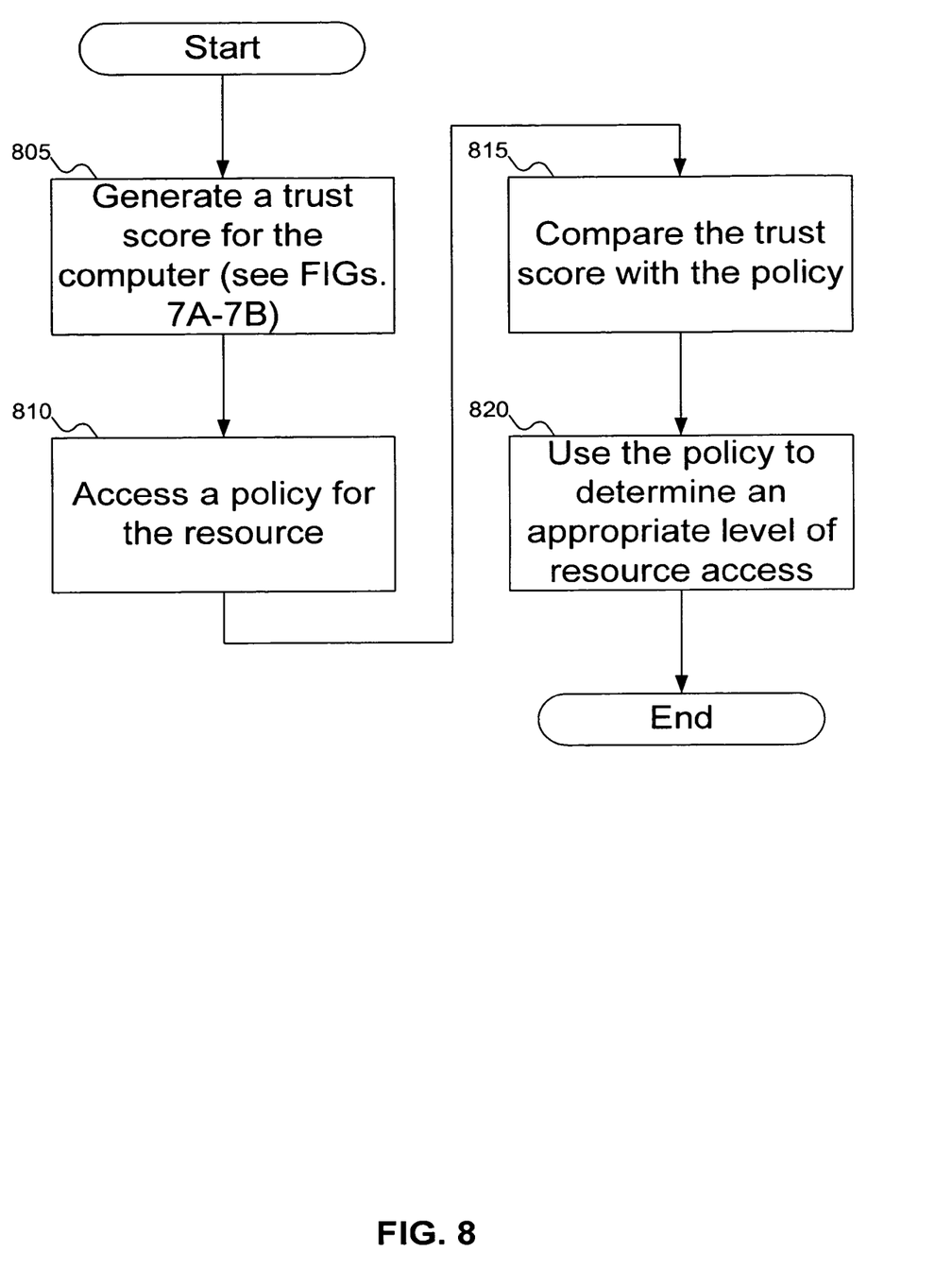
FIG. 8 shows a flowchart of the procedure used by the integrity validator of FIG. 1 to grant or deny a computer system, such as the computer system of FIG. 1, access to a network resource.

FIG. 8 shows a flowchart of the procedure used by the integrity validator of FIG. 1 to grant or deny a computer, such as the computer of FIG. 1, access to a network resource. In FIG. 8, at step 805, the integrity validator generates a trust score for a computer system, as discussed above with reference to FIGS. 7A-7B. At step 810, the integrity validator accesses a policy for the desired resource. At step 815, the integrity validator compares the trust score with the policy. Finally, at step 820, the integrity validator uses the policy to determine an appropriate level of access to the resource for the computer system.

The following discussion is intended to provide a brief, general description of a suitable machine in which certain aspects of the invention may be implemented. Typically, the machine includes a system bus to which is attached processors, memory, e.g., random access memory (RAM), read-only memory (ROM), or other state preserving medium, storage devices, a video interface, and input/output interface ports. The machine may be controlled, at least in part, by input from conventional input devices, such as keyboards, mice, etc., as well as by directives received from another machine, interaction with a virtual reality (VR) environment, biometric feedback, or other input signal. As used herein, the term "machine" is intended to broadly encompass a single machine, or a system of communicatively coupled machines or devices operating together. Exemplary machines include computing devices such as personal computers, workstations, servers, portable computers, handheld devices, telephones, tablets, etc., as well as transportation devices, such as private or public transportation, e.g., automobiles, trains, cabs, etc.

The machine may include embedded controllers, such as programmable or non-programmable logic devices or arrays, Application Specific Integrated Circuits, embedded computers, smart cards, and the like. The machine may utilize one or more connections to one or more remote machines, such as through a network interface, modem, or other communicative coupling. Machines may be interconnected by way of a physical and/or logical network, such as an intranet, the Internet, local area networks, wide area networks, etc. One skilled in the art will appreciated that network communication may utilize various wired and/or wireless short range or long range carriers and protocols, including radio frequency (RF), satellite, microwave, Institute of Electrical and Electronics Engineers (IEEE) 545.11, Bluetooth, optical, infrared, cable, laser, etc.

The invention may be described by reference to or in conjunction with associated data including functions, procedures, data structures, application programs, etc. which when accessed by a machine results in the machine performing tasks or defining abstract data types or low-level hardware contexts. Associated data may be stored in, for example, the volatile and/or non-volatile memory, e.g., RAM, ROM, etc., or in other storage devices and their associated storage media, including hard-drives, floppy-disks, optical storage, tapes, flash memory, memory sticks, digital video disks, biological storage, etc. Associated data may be delivered over transmission environments, including the physical and/or logical network, in the form of packets, serial data, parallel data, propagated signals, etc., and may be used in a compressed or encrypted format. Associated data may be used in a distributed environment, and stored locally and/or remotely for machine access.

Having described and illustrated the principles of the invention with reference to illustrated embodiments, it will be recognized that the illustrated embodiments may be modified in arrangement and detail without departing from such principles, and may be combined in any desired manner. And although the foregoing discussion has focused on particular embodiments, other configurations are contemplated. In particular, even though expressions such as "according to an embodiment of the invention" or the like are used herein, these phrases are meant to generally reference embodiment possibilities, and are not intended to limit the invention to particular embodiment configurations. As used herein, these terms may reference the same or different embodiments that are combinable into other embodiments.

Consequently, in view of the wide variety of permutations to the embodiments described herein, this detailed description and accompanying material is intended to be illustrative only, and should not be taken as limiting the scope of the invention. What is claimed as the invention, therefore, is all such modifications as may come within the scope and spirit of the following claims and equivalents thereto.

The invention claimed is:

1. An apparatus, comprising:
   a database arranged to store a first plurality of signatures for a first plurality of modules;
   a receiver to receive a second plurality of signatures corresponding to a second plurality of modules in a machine;
   a validator operative to compare at least a received one of the second plurality of signatures with the one or more of plurality of signatures in the database, to identify a first subset of the second plurality of modules for which the corresponding signatures are found in the database, and to identify a second subset of the second plurality of modules for which the corresponding signatures are not found in the database; and
   a trust score generator to generate a trust score for the machine based on the first subset of the second plurality of modules for which the corresponding signatures are found in the database and the second subset of the second plurality of modules for which the corresponding signatures are not found in the database.

2. An apparatus according to claim 1, wherein the first plurality of signatures for the first plurality of modules includes a first plurality of hashes for the plurality of modules.

3. An apparatus according to claim 1, wherein:
   the apparatus further comprises a transmitter to transmit the signatures corresponding to the second subset of the second plurality of modules for which the corresponding signatures are not found in the database to a second database of signatures;
   the receiver is operative to receive from the second database a second trust score; and
   the trust score generator is operative to generate the trust score based on the first subset of the plurality of modules for which the corresponding signatures are found in the database and the second trust score.

4. An apparatus according to claim 1, wherein:
   the database is arranged to store a first plurality of identifiers for the first plurality of modules;
   the receiver is operative to receive a second plurality of identifiers for the second plurality of modules in the machine; and
   the validator is operative to compare the second plurality of signatures with the plurality of signatures in the database using the second plurality of identifiers for the plurality of modules in the machine.

5. An apparatus according to claim 1, further comprising a policy to control access to a resource, the policy including a threshold score to receive full access to the resource.

6. An apparatus according to claim 5, the policy further comprising a second threshold score to receive partial access to the resource.

7. An apparatus according to claim 1, wherein the receiver is operative to receive a signature of a module to add to the database.

8. An apparatus according to claim 1, further comprising a transmitter to transmit said trust score to the machine.

9. A method, comprising:
   receiving a first plurality of signatures corresponding to a plurality of modules in a machine;
   comparing the first plurality of signatures for the plurality of modules with a second plurality of signatures in a database;

identifying a first subset of the plurality of modules for which the corresponding signatures are found in the database and a second subset of the plurality of modules for which the corresponding signatures are not found in the database; and generating a trust score for the machine based on the first subset of the plurality of modules for which the corresponding signatures are found in the database and a second subset of the plurality of modules for which the corresponding signatures are not found in the database.

10. A method according to claim 9, further comprising controlling access to a resource on a network based on the trust score.

11. A method according to claim 10, wherein controlling access to a resource on a network based on the trust score includes:

accessing a policy for access to the resource on the network; and using the policy to control access to the resource based on the trust score.

12. A method according to claim 11, wherein using the policy to control access to the resource based on the trust score includes granting full access to the resource if the trust score exceeds a threshold score according to the policy.

13. A method according to claim 11, wherein using the policy to control access to the resource based on the trust score includes granting partial access to the resource if the trust score is higher than a first threshold score but lower than a second threshold score according to the policy.

14. A method according to claim 11, wherein using the policy to control access to the resource based on the trust score includes denying access to the resource if the trust score is lower than a threshold score according to the policy.

15. A method according to claim 9, wherein generating a trust score includes weighting at least a first module more highly than at least a second module in generating the trust score.

16. A method according to claim 9, wherein receiving a first plurality of signatures includes receiving an integrity log including the first plurality of signatures corresponding to the plurality of modules.

17. A method according to claim 9, wherein:

the method further comprises:

forwarding the signatures corresponding to the second subset of the plurality of modules for which the corresponding signatures are not found in the database to a second database of signatures; and receiving from the second database a third subset of the plurality of modules for which the corresponding signatures are found in the second database and a fourth subset of the plurality of modules for which the corresponding signatures are not found in the second database; and generating a trust score includes generating the trust score based on the first subset of the plurality of modules for which the corresponding signatures are found in the database and the third subset of the plurality of modules for which the corresponding signatures are found in the third database.

18. A method according to claim 9, wherein:

receiving a first plurality of signatures corresponding to a plurality of modules includes receiving the first plurality of signatures and a plurality of identifiers for the plurality of modules; and comparing the first plurality of signatures for the plurality of modules with a second plurality of signatures in a database includes comparing the first plurality of signatures for the plurality of modules with the second plurality of signatures in the database using the plurality of identifiers for the plurality of modules.

19. A method according to claim 9, further comprising transmitting the bust score to the machine.

* * * * *

UNITED STATES PATENT AND TRADEMARK OFFICE
CERTIFICATE OF CORRECTION

PATENT NO. : 7,272,719 B2 Page 1 of 1
APPLICATION NO. : 11/288820
DATED : September 18, 2007
INVENTOR(S) : David Maurits Bleckmann et al.

It is certified that error appears in the above-identified patent and that said Letters Patent is hereby corrected as shown below:

Column 12, line 35, the word "bust" should be replaced with --trust--.

Signed and Sealed this

Twenty-sixth Day of February, 2008

JON W. DUDAS
*Director of the United States Patent and Trademark Office*